United States Patent
Haltiner, Jr.

(10) Patent No.: US 6,562,502 B2
(45) Date of Patent: May 13, 2003

(54) FUEL CELL HOT ZONE PRESSURE REGULATOR

(75) Inventor: Karl Jacob Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 09/839,652

(22) Filed: Apr. 19, 2001

(65) Prior Publication Data

US 2001/0055706 A1 Dec. 27, 2001

Related U.S. Application Data

(60) Provisional application No. 60/268,257, filed on Feb. 13, 2001, and provisional application No. 60/201,568, filed on May 1, 2000.

(51) Int. Cl.⁷ .................. H01M 8/00; H01M 8/04; H01M 8/12; H01M 2/00; H01M 2/02; H01M 2/08
(52) U.S. Cl. .................. 429/25; 429/12; 429/34; 429/35
(58) Field of Search .................. 429/12, 13, 17, 429/19, 22, 25, 34, 35, 36

(56) References Cited

U.S. PATENT DOCUMENTS

| | | | | |
|---|---|---|---|---|
| 3,664,873 A | * | 5/1972 | Buswell et al. | 429/25 |
| 4,444,159 A | * | 4/1984 | Earl | 123/3 |
| 5,202,194 A | * | 4/1993 | VanBerg, Jr. | 429/13 |
| 5,372,617 A | * | 12/1994 | Kerrebrock et al. | 48/61 |
| 5,753,383 A | * | 5/1998 | Cargnelli et al. | 429/13 |
| 5,768,906 A | * | 6/1998 | Tsenter | 62/480 |
| 5,969,435 A | * | 10/1999 | Wilhelm | 307/64 |
| 5,976,725 A | * | 11/1999 | Gamo et al. | 429/25 |
| 6,183,895 B1 | * | 2/2001 | Kudo et al. | 429/20 |
| 6,245,303 B1 | * | 6/2001 | Bentley et al. | 422/193 |
| 6,375,906 B1 | * | 4/2002 | Edlund et al. | 422/189 |
| 6,383,670 B1 | * | 5/2002 | Edlund et al. | 429/20 |
| 6,423,896 B1 | * | 7/2002 | Keegan | 136/253 |

* cited by examiner

Primary Examiner—Carol Chaney
Assistant Examiner—Donald V. Scaltrito
(74) Attorney, Agent, or Firm—Vincent A. Cichosz

(57) ABSTRACT

A fuel cell system and a method of using a pressure regulator in a fuel cell system are disclosed herein. The method comprises controlling a purge gas pressure of a purge gas disposed in an enclosure disposed around a fuel cell stack and a waste energy recovery assembly, by seating a pressure plunger in a seating portion of a pressure regulator, wherein the purge gas unseats the pressure plunger when the purge gas pressure exceeds a desired pressure. The method further comprises passing a sufficient amount of the purge gas past the seating portion to reduce the purge gas pressure to at least the desired pressure.

18 Claims, 2 Drawing Sheets

US 6,562,502 B2

FUEL CELL HOT ZONE PRESSURE REGULATOR

CROSS-REFERENCE TO RELATED APPLICATION

The present application claims the benefit of the filing date of U.S. Provisional Application No. 60/268,257, filed on Feb. 13, 2001, and of U.S. Provisional Application No. 60/201,568, filed on May 1, 2000; both of which are incorporated herein by reference in their entirety.

BACKGROUND

Alternative transportation fuels have been represented as enablers to reduce toxic emissions in comparison to those generated by conventional fuels. At the same time, tighter emission standards and significant innovation in catalyst formulations and engine controls has led to dramatic improvements in the low emission performance and robustness of gasoline and diesel engine systems.

One approach to addressing the issue of emissions is the employment of fuel cells, particularly solid oxide fuel cells ("SOFC"), in an transportation vehicle. A fuel cell is an energy conversion device that converts chemical energy into electrical energy. The fuel cell generates electricity and heat by electrochemically combining a gaseous fuel, such as hydrogen, carbon monoxide, or a hydrocarbon, and an oxidant, such as air or oxygen, across an ion-conducting electrolyte. The fuel cell generally consists of two electrodes positioned on opposite sides of an electrolyte. The oxidant passes over the oxygen electrode (cathode) while the fuel passes over the fuel electrode (anode), generating electricity, water, and heat.

A SOFC is constructed of solid-state materials, utilizing an oxygen ion conductive oxide ceramic as the electrolyte. The electrochemical cell in a SOFC is comprised of an anode and a cathode with an electrolyte disposed therebetween.

Application and research efforts during the twentieth century regarding applications of SOFCs was generally concentrated in the stationary power generation industry. Because of those SOFC designs, the SOFC was not readily adaptable for use in a transportation vehicle. A transportation vehicle application imposes specific temperature, volume, and mass requirements, as well as real world factors, such as fuel infrastructure, government regulations, and cost. Several other types of fuel cell systems (i.e. Proton Exchange Membrane (PEM) fuel cells) have been adapted for use in transportation vehicles, but require on-board storage or generation of hydrogen, and complex water management systems for on-board fuel reforming and system hydration. The on-board storage and water management systems add cost and complexity to the overall system.

SUMMARY

The drawbacks and disadvantages of the prior art are overcome by a fuel cell comprising a pressure regulator and a method for pressure regulation.

A method of using a pressure regulator in a fuel cell system is disclosed. The method comprises controlling a purge gas pressure of a purge gas disposed in an enclosure disposed around a fuel cell stack and a waste energy recovery assembly, by seating a pressure plunger in a seating portion of a pressure regulator, wherein the purge gas unseats the pressure plunger when the purge gas pressure exceeds a desired pressure. The method further comprises passing a sufficient amount of the purge gas past the seating portion to reduce the purge gas pressure to at least the desired pressure.

A fuel cell system having a pressure regulator is also disclosed. The fuel cell system comprises an enclosure. A waste energy recovery assembly, a fuel cell stack and a pressure regulator are disposed in the enclosure. The fuel cell stack is in fluid communication with the waste energy recovery assembly. A purge gas is in fluid communication with the enclosure. The pressure regulator is in fluid communication with the purge air and an area external to the enclosure via the waste energy recovery assembly.

The above described and other features are exemplified by the following figures and detailed description.

BRIEF DESCRIPTION OF THE DRAWINGS

Referring now to the figures, wherein like elements are numbered alike.

DETAILED DESCRIPTION

Application of a SOFC in a transportation vehicle imposes specific temperature, volume, and mass requirements, as well as "real world" factors such as fuel infrastructure, government regulations, and cost to be a successful product. This SOFC power generation system can be designed as the main power unit or the design can focus on the power output necessary to serve as an auxiliary power unit (APU) on-board and not as the primary energy source of the vehicle. This APU would be the electrical generator to supply the electrical loads that are on-board the vehicle. The design operates at higher overall efficiency (i.e., fuel energy input to electrical energy output) than current electromechanical alternator systems employed in vehicles. The efficient operation of the SOFC system also permits electrical power to be generated on-board a vehicle even when the primary internal combustion engine is not operating (which will be critical to "no-idle" emissions laws being enacted in global regions).

Figure 1:
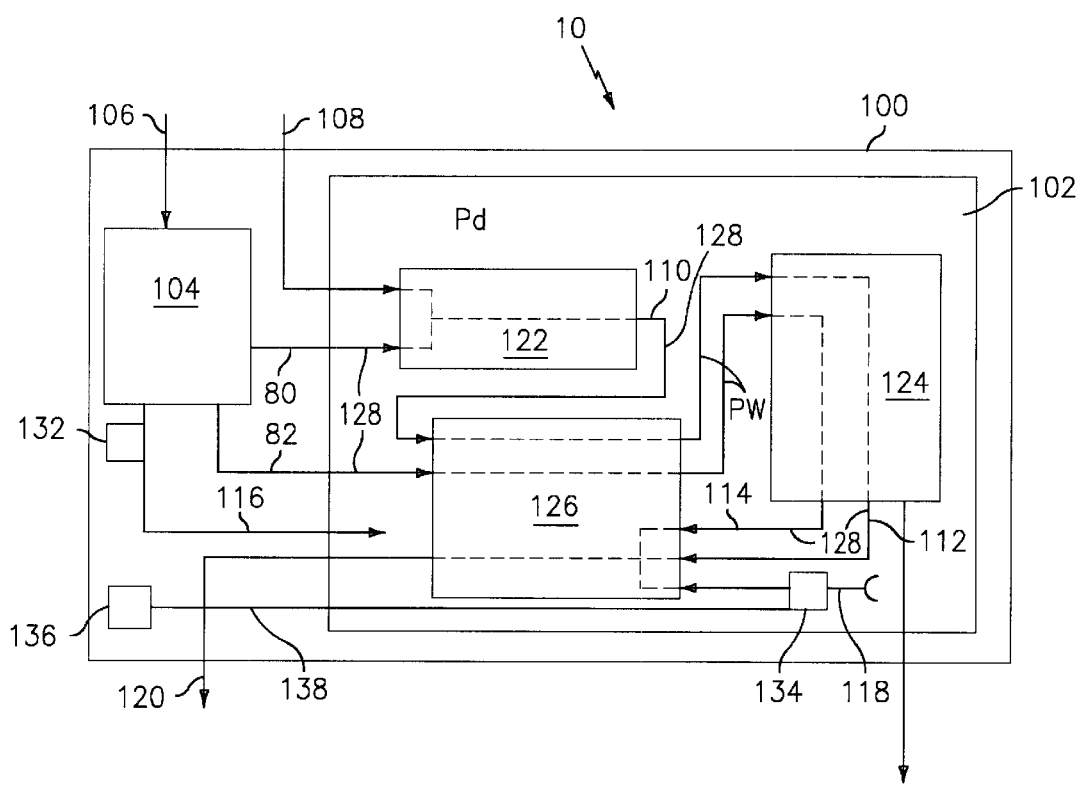
FIG. 1 is schematic of an exemplary system mechanization of a transportation industry SOFC system.

Referring now to FIG. 1, a detailed system mechanization of a SOFC system or simply fuel cell system 10 is schematically depicted. The system enclosure 100 comprises an enclosure (commonly referred to as a hot box chamber) 102. The system enclosure 100 comprises process air system 104 having controls (e.g., blowers, air control valves, and the like) (not shown). The hot box chamber 102 can comprise a SOFC stack 124, a reformer 122, and a waste energy recovery (WER) (or heat exchanger) assembly 126.

During operation of the SOFC system 10, air 80 from a supply of air 106 and/or water (not shown) along with fuel 108 are directed to a reformer 122 that reacts the fuel and air (or water) to produce a reformate 110 (e.g., hydrogen, carbon monoxide, methane, and the like). From the reformer 122, reformate 110 can be directed to the SOFC stack 124 and/or to the waste energy recovery assembly 126. In the waste energy recovery assembly 126 the reformate 110 and optionally air 82 are heated to a sufficient temperature (e.g., up to about 800° C. or so) for use in the SOFC stack 124. In the SOFC stack 124, the reformate and air are reacted on electrodes to produce electricity and byproducts (i.e., hot anode exhaust 112 comprising unreacted fuel, water, and byproducts, and hot cathode exhaust 114 comprising unused oxygen and byproducts). The reformate 110, air 80, air 82, anode exhaust 112 and cathode exhaust 114 are also known as working gases 128. The working gases can have a working gas pressure Pw. The anode exhaust 112 and cathode exhaust 114 are directed through the waste energy recovery assembly 126 where they are burned and/or catalytically reacted to remove the unreacted fuel from the stream and to produce thermal energy and a clean exhaust 120 (e.g., exhaust comprising less than 10 ppm combined hydrocarbons and carbon monoxide, with about 10 ppm or less preferred). Prior to venting the exhaust 120 to the environment, the burned stream is directed through the waste energy recovery assembly 126 to provide thermal communication between the burned stream and the reformate 110 and the air 82, thereby transferring thermal energy from the exhaust streams 112, 114 to the reformate 110 and air 82.

Optionally, a portion of the reformate 110 can be combined and burned with the exhaust streams 112, 114. For example, during the early part of start-up (e.g., at temperatures below about 400° C.), low-grade reformate from the reformer 122 can be routed directly to the waste energy recovery assembly 126 catalytic combustion zone (note shown). In the catalytic combustion zone, the reformate is burned to heat the assembly 126 and heat the reformate 110 that passes through the assembly 126 to the SOFC stack 124.

Additionally, thermal adjustment air (not shown) can be introduced to the combined exhaust streams 112, 114, or with the cathode exhaust 114, either within or external to the waste energy recovery assembly 126, to control the temperature of the assembly 126, and thereby the heat transferred to the reformate 110 and the air 82. Further, purge gas 116 can be directed through air exhaust inlet 118 into the waste energy recovery assembly 126 to be processed with the exhaust streams 112, 114, and to maintain the system enclosure 100 at a desired pressure.

Purge gas 116, which can be employed optionally to assist in controlling the hot box chamber 102 temperature, and to maintain the hot box chamber 102 at a pressure exceeding the pressure of the various hot box components and conduits, is introduced to the hot box chamber 102 by air control valve 132. The air control valve 132 is preferably controlled based upon the temperature of the hot box chamber 102 and optionally the pressure thereof. Due to the pressure P1, the purge gas 116 inhibits leakage of working gases 128 (reformate, oxidant, exhaust gases, and the like), into the hot box chamber 102.

The pressure P1 of the hot box chamber 102 can be controlled by a pressure regulator 134 and air flow rate controlled by air control valve 132 to provide the desired flow rate and pressure of purge air or purge gas 116 to attain the appropriate degree of cooling and to prevent leakage of system fluids from system components and conduits. Once in the hot box chamber 102, the purge gas 116 can be exhausted via the enclosure air exhaust inlet 118, through the waste energy recovery assembly 126, to the exterior of the system enclosure via exhaust 120.

In order to control, adjust, and/or maintain the desired pressure in the hot box chamber 102, a pressure regulator(s) 134 is disposed in exhaust inlet 118. This pressure regulator 134 is in operable communication with the control gas supply 136. Temperature sensor(s) within the hot box chamber 102 monitor the temperature of the hot box chamber 102. The data obtained from the sensors is utilized by the electronic control system to control the amount of purge gas 116 allowed to exit the hot box chamber 102 through pressure regulator 134 by using air control valve 132. Pressure sensor(s) in the hot box monitor the pressure in the hot box. Data obtained from the sensor is used by the electronic controller to control the pressure in the hot box by controlling the control gas supply 138 and control gas pressure Pc. In this way, the pressure in the hot box can be controlled independent of the purge gas flow.

Figure 2:
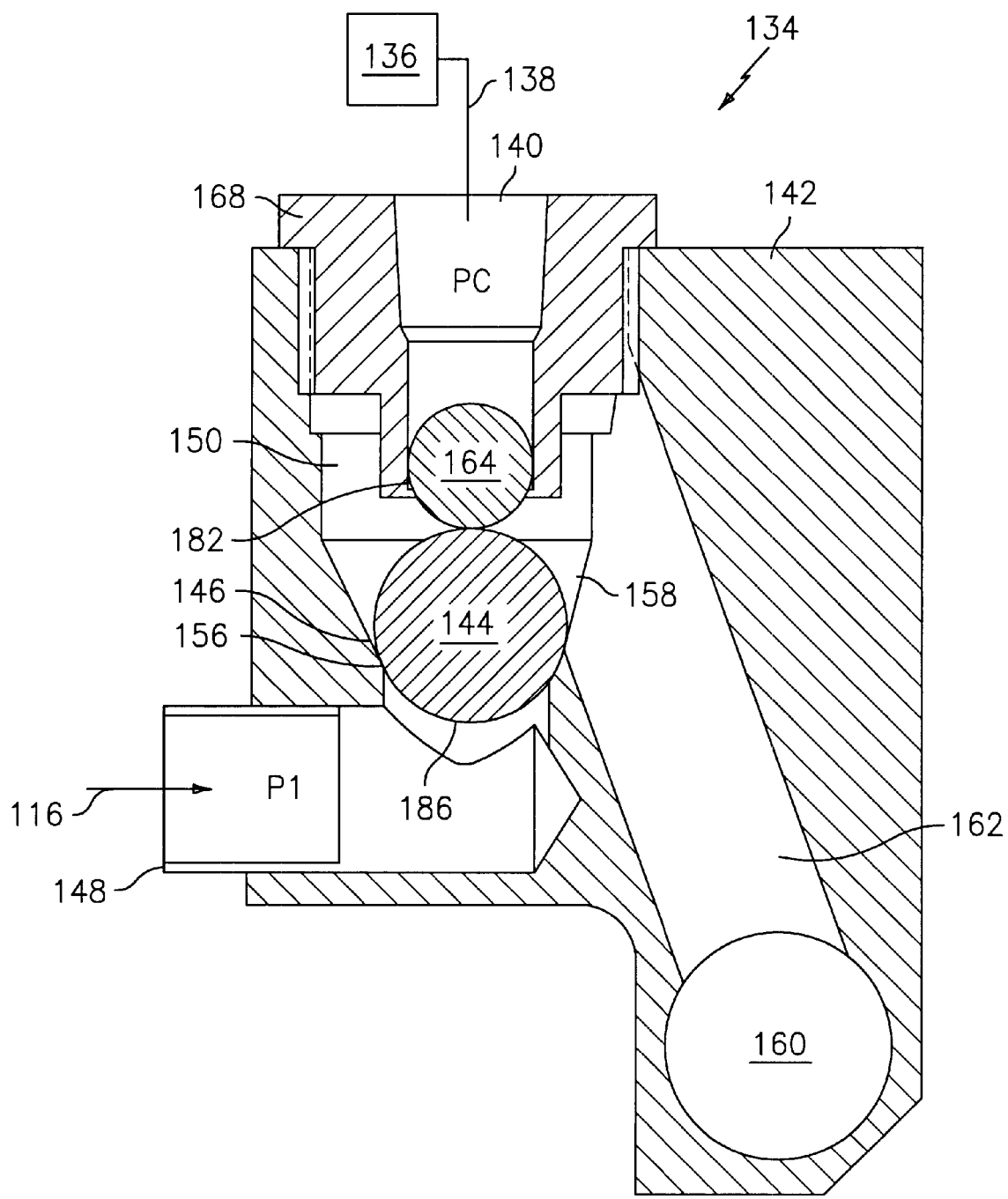
FIG. 2 is a cross sectional side view of an exemplary pressure regulation valve.

Due to the conditions within the hot box chamber 102, namely temperatures up to about 1,000° C., with operating temperatures up to about 800° C., the pressure regulator 134 should maintain structural integrity in high temperatures and be capable of maintaining a desired pressure even as the temperature changes. Referring to FIG. 2, a pressure regulator 134 is shown with a valve body 142. The valve body 142 comprises a pressure plunger 144 slidably engaged within a seating portion 146 of a chamber 150 having a port 158. Disposed concentrically within the chamber 150 is a cap 168 having a control gas inlet 140 and a control plunger 164 that is in operable communication with the pressure plunger 144. The control plunger 164 is disposed in fluid communication with a control gas 138 and in operable communication with a control gas supply 136. Meanwhile, the pressure plunger 144 is in fluid communication with the purge gas 116 via inlet port 148 and with the waste energy recovery assembly 126 via port 158, passage 162 and outlet 160.

The pressure plunger 144 acts as a moving actuator to control the pressure of gas (purge gas) within the hot box chamber 102. (See FIG. 1) The pressure plunger 144 preferably comprises a geometry capable of engaging seating portion 146 to form a seal that inhibits gas transfer through the seating portion 146 at pressures below the desired pressure Pd. For example, if the seating portion 146 comprises a conical geometry, the plunger can comprise a rounded geometry. Some possible plunger geometries include cylindrical (e.g., a piston, and the like), rounded (e.g., a sphere, ellipse, oval, and the like), and multisided (e.g., triangular, pyramidal, hexagonal, and the like).

The seating portion 146 is a bore having any geometry that is complementary to the plunger geometry such that a positive seal is provided when the pressure plunger 144 is actuated against a plunger seat 156. Optional seating portion geometries comprise funnel like, cylindrical, conical, inverted frustum, other polyhedral configurations, and the like, as well as combinations comprising at least one of the foregoing geometries.

Seating portion 146 is disposed in fluid communication with the purge gas 116 via inlet port 148 and the control gas 138 via control gas inlet 140. The inlet port 148 allows the purge gas 116 to enter seating portion 146 and actuate the pressure plunger 144. The control gas inlet 140 enables access of the control gas 138 to the control plunger 164, thereby disposing the control gas supply 136 in operable communication with the pressure plunger 144 and in fluid communication with control plunger 164. The control gas 138 produces a positive force against the control plunger 164, and hence the pressure plunger 144, in a direction opposite the force exerted by the purge gas 116.

The seating portion 146 is further in fluid communication with the waste energy recovery assembly 126 via a waste energy recovery assembly port 158 disposed in operable communication with the seating portion 146 such that when sufficient pressure is applied by the purge gas 116 to the pressure plunger 144, the plunger is forced toward control plunger 164, rendering the purge gas 116 and the port 158 in fluid communication. The purge gas 116 biases or unseats the pressure plunger 144 from the plunger seat 156 of seating portion 146. Upon dislocation of the pressure plunger 144 from the plunger seat 156, the purge gas 116 flows from the hot box chamber 102, through the inlet port 148, seat portion 146, chamber 150, port 158, passage 162, and outlet 160 to the waste energy recovery assembly 126.

The chamber 150 comprising the seating portion 146 and the port 158, can be removably connected to the cap 168 such that the pressure plunger 144 and/or the control plunger 164 can be easily serviced and/or replaced. Possible removable connections include mechanical connections such as threads, locking clips, interlocking flanges, and the like, disposed on one or both of the chamber 150 and the cap 168.

The cap 168 comprises the control gas inlet 182 to enable control gas 138 to flow from a control gas supply 136 to the chamber 150. In the chamber 150, the control gas 138 exerts the pressure on the control plunger 164 to, in conjunction with the size and weight of the pressure plunger 144 the weight of the control plunger 164 and seating friction between the pressure plunger 144 and the plunger seat 156, determine the pressure of the purge gas 116. The forces of the pressure and weight of the components of the pressure regulator 134 can be collectively called the combined force.

As with the seating portion 146, an end portion of cap 168 is configured to engage with an outside diameter of control plunger 164. Preferably, at least a portion of the cap 168 is sized and/or has a weight to exert the desired force on the pressure plunger 144 to attain the desired pressure Pd within the hot box chamber 102. For example, the cap 168 can have a geometry capable of enabling slidable engagement of the control plunger 164 with the pressure plunger 144, while preferably not allowing, or allowing minimal, fluid communication between the control gas 138 and the purge gas 116. In one embodiment, the geometry can be cylindrical with a shoulder, lip, or protrusion 182 formed on an end adjacent the pressure plunger 144 by a reduced inside diameter bore of cap 168.

In operation, the control gas supply 136 pressure Pc is controlled by a controller (not shown) actuating the control plunger 164. This pressure controller can consist of an air pressure source (such as the same source of air used for the purge gas) which feeds a solenoid valve capable of modulating the pressure Pc to the control plunger, which is, in turn, controlled by an electronic controller. In a preferred embodiment (referring to FIG. 2), pressure plunger 144 is mechanically actuated by the pressure of purge gas P1 acting on the bottom portion surface 186 of pressure plunger 144, which causes the pressure plunger 144 to translate toward the control gas inlet 140 once the purge gas 116 reaches or exceeds a predetermined pressure or flow rate, dependent upon the bias acting on the pressure plunger 144.

If the pressure of control gas Pc is sufficient enough, the control gas 138 will force the control plunger 164, to engage pressure plunger 144 and also urge pressure plunger 144 to engage the plunger seat 156 of seating portion 146, thereby preventing purge gas 116 flow from the hot box chamber 102 (FIG. 1).

Purge gas pressure P1 is dependent on the pressure force maintained by the pressure regulator 134. The pressure force is the weight of the control plunger 164, size and weight of the pressure plunger 144, the included angle of the plunger seat 146, and the pressure of the control gas Pc. When the pressure P1 is too high, e.g., exceeds the pressure force, the pressure plunger 144 is biased by purge gas 116 and unseated from plunger seat 156.

When the pressure plunger 144 unseats from the plunger seat 156, the purge gas 116 flows past the waste energy recovery port 158 and into the passage 162 to the waste energy recovery assembly 126 where it can be utilized in the WER combustion process. When the purge gas 116 in hot box chamber 102 is at a pressure P1, that is below a desired pressure Pd, the pressure regulator 134 is biased to prevent flow through seating portion 146 allowing pressure in the hot zone to build up to the desired level. This can be accomplished by maintaining the control gas 138 at a pressure Pc that biases the control plunger 164 against the pressure plunger 144 such that the pressure plunger 144 positively seats against the plunger seat 156, thereby sealing the flow path of the purge gas 116. Additionally, the weight of the control plunger 164 and the weight of the pressure plunger 144 can bias the pressure plunger 144 to seat against the seat 156.

The pressure regulator controls the pressure in the hot box chamber and prevents the possibility of backflow from the SOFC gas streams into the hot box chamber. Leaks that develop in the fuel cell system can be mitigated as a result of the higher pressure maintained in the hot box chamber. The hot box chamber gases will leak into the fuel cell system, rather than the combustible gases of the fuel cell system leaking out into the hot box chamber. The pressure regulator is compatible with the high temperature environment of the hot box chamber due to the high temperature materials used in the construction of the pressure regulator and the fact that electronic controls are not required in the pressure regulator itself. Computers, controllers and the like can optionally be employed outside the hot box, with the pressure regulator disposed within the hot box.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fuel cell system comprising:
   an enclosure;
   a waste energy recovery assembly disposed in said enclosure;
   a fuel cell stack disposed in said enclosure, said fuel cell stack being in fluid communication with said waste energy recovery assembly;
   purge gas in fluid communication with said enclosure; and
   a pressure regulator disposed in said enclosure, said pressure regulator being in fluid communication with said purge gas and an area external to said enclosure via said waste energy recovery assembly.

2. The fuel cell system of claim 1, wherein said pressure regulator further comprises:
   a valve body;
   a seating portion disposed in said valve body;
   a pressure plunger slidably engaged with said seating portion; and
   a control plunger in operable communication with said pressure plunger.

3. The fuel cell system of claim 2, further comprising a control gas supply in fluid communication with said control plunger.

4. The fuel cell system of claim 2, wherein said pressure regulator further comprises an inlet port in fluid communication with said purge gas supply and said pressure plunger.

5. The fuel cell system of claim 2, wherein said pressure regulator further comprises a second port disposed in said seating portion, said second port being in fluid communication with a passage, said passage being in fluid communication with an outlet.

6. The fuel cell system of claim 5, wherein said pressure regulator further comprises a cap removably disposed in said valve body, wherein said control plunger is slidably disposed in said cap.

7. The fuel cell system of claim 2, where said seating portion and said pressure plunger comprise complementary geometries capable of inhibiting gas from passing through said seating portion when said gas has a pressure below a desired pressure.

8. The fuel cell system of claim 7, wherein said pressure plunger comprises a geometry capable of engaging said seating portion.

9. The fuel cell system of claim 1, further comprising a reformer disposed in said enclosure and in fluid communication with said fuel cell stack.

10. A method of using a pressure regulator in a fuel cell system, comprising:
   controlling a purge gas pressure of a purge gas disposed in an enclosure disposed around a fuel cell stack and a waste energy recovery assembly, by seating a pressure plunger in a seating portion of a pressure regulator, wherein said purge gas unseats said pressure plunger when said purge gas pressure exceeds a desired pressure; and
   passing a sufficient amount of said purge gas past said seating portion to reduce said purge gas pressure to at least said desired pressure.

11. The method of claim 10, wherein said desired pressure is greater than a pressure of working gases.

12. The method of claim 10, wherein said pressure regulator further comprises said seating portion disposed in a valve body, a pressure plunger slidably engaged with said seating portion, a control plunger in operable communication with said pressure plunger.

13. The method of claim 12, further comprising applying a control pressure against said pressure plunger with a control plunger.

14. The method of claim 13, further comprising applying a control gas pressure against said control plunger from a control gas supply, wherein said control gas pressure urges said control plunger against said pressure plunger.

15. The method of claim 13, wherein controlling said purge gas pressure comprises unseating said pressure plunger when said purge gas pressure exceeds a combined force formed by said control gas pressure, a weight of said pressure plunger, a weight of said control plunger, and seating friction between said pressure plunger and said seating portion.

16. The method of claim 15, further comprising reseating said pressure plunger when said purge gas pressure reduces to a value below said combined force.

17. The method of claim 10, further comprising directing said purge gas to said waste energy recovery assembly.

18. A fuel cell system, comprising:
   means for controlling a purge gas pressure of a purge gas disposed in an enclosure disposed around a fuel cell stack and a waste energy recovery assembly, by seating a pressure plunger in a seating portion of a pressure regulator, wherein said purge gas unseats said pressure plunger when said purge gas pressure exceeds a desired pressure; and
   means for passing a sufficient amount of said purge gas past said seating portion to reduce said purge gas pressure to at least said desired pressure.

* * * * *